United States Patent [19]

Mita et al.

[11] 4,322,272

[45] Mar. 30, 1982

[54] CURABLE COMPOSITION

[75] Inventors: Tetsuo Mita; Nobutaka Tani; Hirokazu Nakanishi; Junji Takase; Katsuhiko Isayama, all of Kobe, Japan

[73] Assignee: Kanegafuchi Kagaku Kogyo Kabushiki Kaisha, Osaka, Japan

[21] Appl. No.: 127,750

[22] Filed: Mar. 6, 1980

[51] Int. Cl.$^3$ .................. C08F 2/48; C08G 77/00; C08L 83/00

[52] U.S. Cl. .................. 204/159.13; 204/159.14; 204/159.15; 525/105; 528/26; 528/28

[58] Field of Search .................. 204/159.13, 159.14, 204/159.15; 260/3; 525/288

[56] References Cited

U.S. PATENT DOCUMENTS 4,026,826  5/1977  Yoshida et al. ............... 204/159.13
4,058,583  11/1977  Glander et al. ............... 204/159.13
4,117,063  9/1978  Voigt et al. ..................... 525/288

*Primary Examiner*—Allan Lieberman
*Attorney, Agent, or Firm*—Haight, Rosfeld & Noble

[57] ABSTRACT

Compositions curable upon exposure to atmospheric moisture at room temperature comprising (a) organic polymer having at least one hydrolyzable silicon-containing group in the molecule and having a molecular weight from about 500 to 15,000 and (b) a photocurable substance.

9 Claims, No Drawings

CURABLE COMPOSITION

This invention relates to a curable composition comprising a polymer having a hydrolyzable silicon-containing group, which is curable to a rubber-like substance upon exposure to atmospheric moisture at room temperature.

The above type of composition finds many applications, for example, as a sealant or adhesive used for building construction. Important characteristics required for this type of composition are, among others, residual tack and weatherdurability of adhesive force after application. These characteristics are directly related to the deposition of dust particles on the rsulting sealant surfaces and the adhesive force with glass. In U.S. Pat. No. 3,971,751, assigned to the same assignee as the present application, there is shown a curable composition comprising a polyether having a hydrolyzable silicon containing group which exhibits good mechanical properties such as strength, elongation, adhesion and the like. Similar polymeric compositions having a hydrolyzable silicon containing group include those described in U.S. Pat. Nos. 3,408,321, 3,592,795 and 3,632,557. Experience has shown, however, that these curable compositions are not satisfactory in residual tack and weather-durability of adhesive force.

According to the present invention, we have found that the foregoing and other disadvantages may be overcome by compounding (a) about 100 parts by weight of an organic polymer having at least one hydrolyzable silicon-containing group in the molecule and having a molecular weight from about 500 to 15,000, and (b) about 0.01 to 30 parts by weight of a photocurable substance. The resulting mixture becomes tack-free very shortly and retains its maximum adhesive force upon exposure to light for a long time.

The photocurable substance will react only in those areas which are exposed to light such as the exterior surface or interface of sealant with glass, to improve the tack-free time and photo-durability in these areas without affecting on other properties of the sealant such as strength, elongation or the like.

The term "photocurable substance" used herein designates those substances which are capable of photopolymerization or photocrosslinking to produce an insoluble mass. Several types of photocurable substance are known in the art including acrylic or methacrylic monomers and oligomers, polyvinylcinnamate and organic azide group-containing materials. Photocurable acrylic or methacrylic monomers and oligomers are acrylic or methacrylic esters, preferably esters of a polyhydric aliphatic alcohol with acrylic or methacrylic acid having at least two ester linkages in the molecule. Examples of these esters include diethyleneglycol diacrylate, polyethyleneglycol diacrylate, neopentylglycol diacrylate, 1,5-pentanediol diacrylate, 1,6-hexanediol diacrylate, trimethylolpropane triacrylate and the corresponding methacrylates. Mixtures of these monomers and oligomers may also be used.

Polyvinyl cinnamate may be produced by acylating polyvinyl alcohol with, for example, cinnamoyl chloride. Derivatives of polyvinylcinnamate such as mixed esters with dibasic carboxylic acid may also be used.

Examples of organic azide group-containing materials include azidized natural or synthetic rubber and azide groupcontaining polyorganosiloxanes as shown in Japanese Laying Open Patent Application No. 30250/79.

The polymers having hydrolyzable silicon-containing groups which may be used in the present invention include those described in the above-cited patents. Preferably they have a polyether or polyester main chain having a molecular weight of about 500 to about 15,000 and are each terminated with at least one hydrolyzable group of the formula:

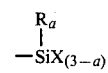

wherein R is a hydrocarbon group of 1 to 20 carbon atoms, X is a hydrolyzable group such as $C_1$–$C_{10}$ alkoxy group, aminoxy group or the like, and is a 0, 1 or 2, About 0.01 to about 30 parts by weight of said photocurable substance may be incorporated to 100 parts by weight of said hydrolyzable group-containing polymer. A proportion of said photocurable substance less than 0.01 parts cannot exhibit the desired effect to the fullest extent, while excessive use thereof may adversely affect on the properties of the resulting sealant.

The curable composition of the present invention may contain plasticizers such as dioctylphthalate, epoxylated soybean oil or the like, fillers such as calcium, carbonate, talc or the like, pigments such as titanium dioxide, carbon black or the like, thixotropic agents such as hydrogenated castor oil, anti-aging agents such as UV-absorbants or free radical initiation inhibitors, and other conventional ingredients.

The curable composition of the present invention may be prepared by kneading or milling the foregoing components on a conventional kneader or paint rollers. When a one component composition is desired, the composition is completely dehydrated after the addition of a curing agent. If desired, the curing agent may be stored and shipped in a separate container and mixed with the curable composition in situ before use.

Examples of curing agents which may be employed in the present invention include tin compounds such as stannous 2-ethylhexanate and, dibutyltindilaurate, lead compounds such as lead 2-ethylhexanate, iron compounds such as iron naphthenate, amines such as laurylamine, basic compounds such as active zinc white, carboxylic acids such as capric acid, alkyl titanates, organosilicon titanates or the like. Mixtures of these agents may be also used. The curing agent can be used in amounts from about 0.001 to 10 parts by weight per 100 parts by weight of hydrolyzable group-containing polymer.

The following examples are given by way of illustration and not by way of limitation. All parts are by weight.

EXAMPLE 1

To 100 parts of a polyoxypropylene having an average molecular weight of 8,000 and terminal groups of the formula:

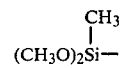

at a proportion of about 80% were added 5 parts of a polyfunctional acrylate (trimethylolpropane triacrylate, sold by Toagosei Chemical Industry Co., Ltd., Tokyo, under the name of ARONIX M-109), 30 parts of dioctyl phthalate, 100 parts of calcium carbonate, 25 parts of titanium dioxide, 3 parts of hydrogenated castor oil and 1 part of styrenated phenol. The mixture was mixed with a lancet and then intimately milled by passing through a 3-roll paint mill three times.

To 264 parts of the resulting mixture were added 1 part of stannous 2-ethylhexanate and 1 part of laurylamine. The mixture was then poured onto a glass plate and allowed to cure under atmospheric conditions while exposing it to light. After 7 days, the resulting cured sheet showed no residual tack by a finger test. The sheet did not peel off from the interface with glass plate by pulling an edge by hand after exposing to light for 60 days. A control having a similar composition but not containing ARONIX M-109 showed residual tack and peeled off in the same tests.

EXAMPLE 2

To 100 parts of a polyoxypropylene having an average molecular weight of 9,000 and terminal groups of the formula:

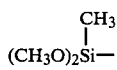

at a proportion of about 90% were added 10 parts of polyvinyl cinnamate, 30 parts of triethyleneglycol diacetate, 100 parts of calcium carbonate, 25 parts of titanium dioxide, 3 parts of hydrogenated castor oil and 1 part of styrenated phenol.

The mixture was mixed with a lancet and then intimately milled by passing through a 3-roll paint mill three times.

To 269 parts of the resulting mixture were added 1 part of stannous 2-ethylhexanate and 1 part of monoethanolamine. The mixture was then dehydrated in vacuo with stirring in a vacuum kneader. The curable composition thus obtained was applied onto outdoor building construction as a sealant. The cured product showed no residual tack after 7 days and had weather-proof adhesion properties.

EXAMPLE 3

To 100 parts of a polyxoypropylene having an average molecular weight of 9,000 and terminal groups of the formula:

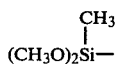

at a proportion of about 85% were added 5 parts of azidized natural rubber, 30 parts of diamylphthalate, 150 parts of calcium carbonate and 1 part of styrenated phenol. The mixture was mixed with a lancet and intimately milled by passing through a 3-roll paint mill three times.

To 286 parts of the resulting mixture were added 2 parts of dibutyltindilaurate and 3 parts of active white zinc and the mixture was thoroughly mixed. The resulting composition was applied onto outdoor construction. The cured product showed no residual tack after 7 days and had weather-proof adhesion properties.

The above has been offered for illustrative purposes only, and it is not for the purpose of limiting the scope of this invention, which is as defined in the claims below.

We claim:

1. A liquid composition capable of being cured to a tack-free, weather-resistant adhesive upon exposure to atmospheric moisture and light, consisting essentially of:
   (a) about 100 parts by weight of an organic polymer having a polyether main chain with at least one terminal hydrolyzable silicon-containing group and a molecular weight from about 500 to 15,000, and
   (b) about 0.01 to 30 parts by weight of a photocurable substance selected from the group consisting of photocurable acrylic or methacrylic monomers and oligomers, polyvinyl cinnamate, and organic azide group-containing materials.

2. The composition according to claim 1, wherein said hydrolyzable silicon-containing group is a group of the formula:

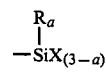

wherein R is a hydrocarbon group of 1 to 20 carbon atoms, X is a hydrolyzable group, and a is 0, 1 or 2.

3. The composition according to claim 2, wherein X is $C_1$-$C_{10}$ alkoxy or aminoxy.

4. The composition according to claim 2, wherein said hydrolyzable silicon-containing group is

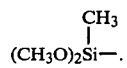

5. The composition according to claim 1, wherein said photocurable substance is an ester of acrylic acid or methacrylic acid with a polyhydric alcohol having at least two ester linkages in the molecule.

6. The composition according to claim 1, wherein said photocurable substance is polyvinylcinamate.

7. The composition according to claim 1, wherein said photocurable substance is azidized natural rubber.

8. The composition according to claim 1, further comprising a curing agent selected from the group consisting of an organic tin compound, an organic lead compound, an organic iron compound, an amine, a carboxylic acid, white zinc, alkyl titanate and organosilicon titanate, the proportion of said curing agent being from about 0.001 to 10 parts by weight per 100 parts by weight of said hydrolyzable silicon group-containing polymer.

9. The composition according to claim 8 which has been cured to form a tack-free, weather-resistant adhesive.

* * * * *